(12) United States Patent
Tan et al.

(10) Patent No.: US 12,056,167 B2
(45) Date of Patent: Aug. 6, 2024

(54) DIALOG GENERATION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Yizhang Tan, Shenzhen (CN); Jiachen Ding, Shenzhen (CN); Changyu Miao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 456 days.

(21) Appl. No.: 17/346,197

(22) Filed: Jun. 11, 2021

(65) Prior Publication Data

US 2021/0303606 A1 Sep. 30, 2021

Related U.S. Application Data

(63) Continuation of application No. PCT/CN2020/073383, filed on Jan. 21, 2020.

(30) Foreign Application Priority Data

Jan. 24, 2019 (CN) .......................... 201910069718.9

(51) Int. Cl.
*G06F 16/332* (2019.01)
*G06F 16/33* (2019.01)
(Continued)

(52) U.S. Cl.
CPC ...... *G06F 16/3329* (2019.01); *G06F 16/3334* (2019.01); *G06F 16/3347* (2019.01); *G06F 40/242* (2020.01); *G06F 40/30* (2020.01)

(58) Field of Classification Search
CPC ............... G06F 16/332; G06F 16/3334; G06F 16/3347; G06F 40/242; G06F 40/30; G06F 40/35
(Continued)

(56) References Cited

U.S. PATENT DOCUMENTS

| 8,645,479 | B2 * | 2/2014 | Liu | ........................ | G06F 40/35 |
| | | | | | 704/251 |
| 9,368,114 | B2 * | 6/2016 | Larson | .................... | G06F 3/165 |

(Continued)

FOREIGN PATENT DOCUMENTS

| CN | 106257441 A | 12/2016 |
| CN | 108038105 A | 5/2018 |

(Continued)

OTHER PUBLICATIONS

The World Intellectual Property Organization (WIPO) International Search Report for PCT/CN2020/073383 Apr. 22, 2020 6 Pages (including translation).

*Primary Examiner* — Pierre Louis Desir
*Assistant Examiner* — Fouzia Hye Solaiman
(74) *Attorney, Agent, or Firm* — ANOVA LAW GROUP, PLLC

(57) ABSTRACT

The present disclosure provides a dialog generation method, performed by a human-machine dialog system. The method includes obtaining an input dialog sequence from a dialog client; obtaining associated information related to the input dialog sequence; encoding, by an encoder, the input dialog sequence to obtain an input encoding vector; encoding, by the encoder, the associated information to obtain an associated encoding vector; decoding, by a decoder, the input encoding vector and the associated encoding vector to obtain an output dialog sequence, the output dialog sequence comprising an out-of-vocabulary word corresponding to the (Continued)

associated information; and transmitting the output dialog sequence to the dialog client.

12 Claims, 5 Drawing Sheets

(51) Int. Cl.
*G06F 40/242* (2020.01)
*G06F 40/30* (2020.01)

(58) Field of Classification Search
USPC .............................................. 704/9
See application file for complete search history.

(56) References Cited

U.S. PATENT DOCUMENTS

| | | | |
|---|---|---|---|
| 10,152,970 B1* | 12/2018 | Olabiyi | G06N 20/00 |
| 2014/0297252 A1 | 10/2014 | Prasad et al. | |
| 2014/0316764 A1* | 10/2014 | Ayan | H04M 3/4936 |
| | | | 704/9 |
| 2017/0372696 A1 | 12/2017 | Lee | |
| 2018/0137109 A1* | 5/2018 | Mangoubi | G06F 40/263 |
| 2018/0217979 A1* | 8/2018 | Lin | G06F 40/284 |
| 2018/0233143 A1* | 8/2018 | Papangelis | G10L 15/16 |
| 2018/0285348 A1* | 10/2018 | Shu | G06N 3/084 |
| 2018/0300400 A1* | 10/2018 | Paulus | G06N 3/044 |

FOREIGN PATENT DOCUMENTS

| | | |
|---|---|---|
| CN | 108829670 A | 11/2018 |
| CN | 110147435 A | 8/2019 |

\* cited by examiner

DIALOG GENERATION METHOD AND APPARATUS, DEVICE, AND STORAGE MEDIUM

RELATED APPLICATIONS

This application is a continuation application of PCT Application No. PCT/CN/2020/073383, entitled "DIALOG GENERATION METHOD, APPARATUS, DEVICE, AND STORAGE MEDIUM" and filed on Jan. 21, 2020, which claims priority to Chinese Patent Application No. 2019100697189, entitled "DIALOG GENERATION METHOD AND APPARATUS, DEVICE, AND STORAGE MEDIUM" and filed with the National Intellectual Property Administration, PRC, on Jan. 24, 2019. The two applications are incorporated herein by reference in their entirety.

FIELD OF THE TECHNOLOGY

Embodiments of this application relate to the field of artificial intelligence, and in particular, to a dialog generation method and apparatus, a device, and a storage medium.

BACKGROUND OF THE DISCLOSURE

The natural language dialog is one of the greatest challenges in artificial intelligence. There are many dialog systems, such as Siri provided by Apple Inc. Such dialog systems can make simple dialogs with humans and complete simple tasks, such as inquiring weather and checking stocks.

SUMMARY

According to embodiments provided in this application, a dialog generation method and apparatus, a device, and a storage medium are provided. Specific technical solutions are as follows.

One aspect of the present disclosure provides a dialog generation method, performed by a human-machine dialog system. The method includes obtaining an input dialog sequence from a dialog client; obtaining associated information related to the input dialog sequence; encoding, by an encoder, the input dialog sequence to obtain an input encoding vector; encoding, by the encoder, the associated information to obtain an associated encoding vector; decoding, by a decoder, the input encoding vector and the associated encoding vector to obtain an output dialog sequence, the output dialog sequence comprising an out-of-vocabulary word corresponding to the associated information; and transmitting the output dialog sequence to the dialog client.

Another aspect of the present disclosure provides a dialog generation apparatus, disposed in a dialog server. The apparatus includes an interface module, an obtaining module, an encoding module, and a decoding module. The interface module is configured to obtain an input dialog sequence from a dialog client. The obtaining module is configured to obtain associated information related to the input dialog sequence. The encoding module is configured to encode the input dialog sequence to obtain an input encoding vector, and to encode the associated information to obtain an associated encoding vector. The decoding module is configured to decode the input encoding vector and the associated encoding vector to obtain an output dialog sequence, the output dialog sequence comprising an out-of-vocabulary word corresponding to the associated information. The interface module is configured to transmit the output dialog sequence to the dialog client.

According to another aspect of this application, a computer device is provided, including a memory and one or more processors. One or more memories store at least one computer-readable instruction, and the at least one computer-readable instruction is loaded and executed by the one or more processors to implement a plurality of operations. The operations include: obtaining an input dialog sequence from a dialog client; obtaining associated information related to the input dialog sequence; encoding, by an encoder, the input dialog sequence to obtain an input encoding vector; encoding, by the encoder, the associated information to obtain an associated encoding vector; decoding, by a decoder, the input encoding vector and the associated encoding vector to obtain an output dialog sequence, the output dialog sequence comprising an out-of-vocabulary word corresponding to the associated information; and transmitting the output dialog sequence to the dialog client.

Another aspect of this disclosure provides a non-transitory computer-readable storage medium storing computer-readable instructions, when executed by one or more processors, the computer readable instructions computer-readable instructions cause one or more processors to implement the dialog generation method described above.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings according to the accompanying drawings without creative efforts.

DESCRIPTION OF EMBODIMENTS

To make objectives, technical solutions, and advantages of the embodiments of this application clearer, the following further describes in detail implementations of this application with reference to the accompanying drawings. The specific implementations described herein are only used to describe this application, instead of limiting this application.

Although the following description uses the terms first, second, etc. to describe elements, the elements are not limited by the terms. The terms are only used to distinguish one element from another. For example, without departing from the scope of examples, a first extended dictionary may be referred to as a second extended dictionary; and similarly, a second extended dictionary may be referred to as a first extended dictionary. Both the first extended dictionary and the second extended dictionary may be extended dictionaries, and in some cases, may be separate and different extended dictionaries.

First, several terms used in the embodiments of this application are briefly introduced.

F (Facts): factual information (such as a news reports) related to a current chat topic.

H (History): opinion information (such as news comments, discussion history) related to a current chat topic.

Encoding: expressing a dialog sequence as one or more encoding vectors, where the "dialog sequence" is generally a dialog sequence of a variable length.

Decoding: outputting a corresponding output dialog sequence according to an encoding vector corresponding to an input dialog sequence.

Attention mechanism: calculating a weight of one vector relative to a plurality of vectors, and obtaining a weighted average according to the weight Copy generation network: a new text generation system that can automatically copy text fragments from an input text to a generated text, or generate new text fragments.

Recurrent neural network (RNN) cell: a component of a recurrent neural network, where for an input vector, an output vector is obtained through linear mapping and non-linear variation of the neural network.

Long short-term memory (LSTM): a variant of the recurrent neural network, which can be used to encode timing information.

In response to an input dialog sequence (a question), a dialog system may select words and phrases from a preset dictionary to form a dialog sequence, i.e., an answer. All words and phrases in the answer come from the preset dictionary. Because all words and phrases in answers outputted by the dialog system are derived from a dictionary while words and phrases in the dictionary are preset and fixed, content of the answers outputted by the dialog system may be limited.

An embodiment of this application provides a dialog generation method applicable to a human-machine dialog system. The system can combine hot events and/or different opinions and automatically generate sentences with facts and/or opinions to reply to the user.

Figure 1:
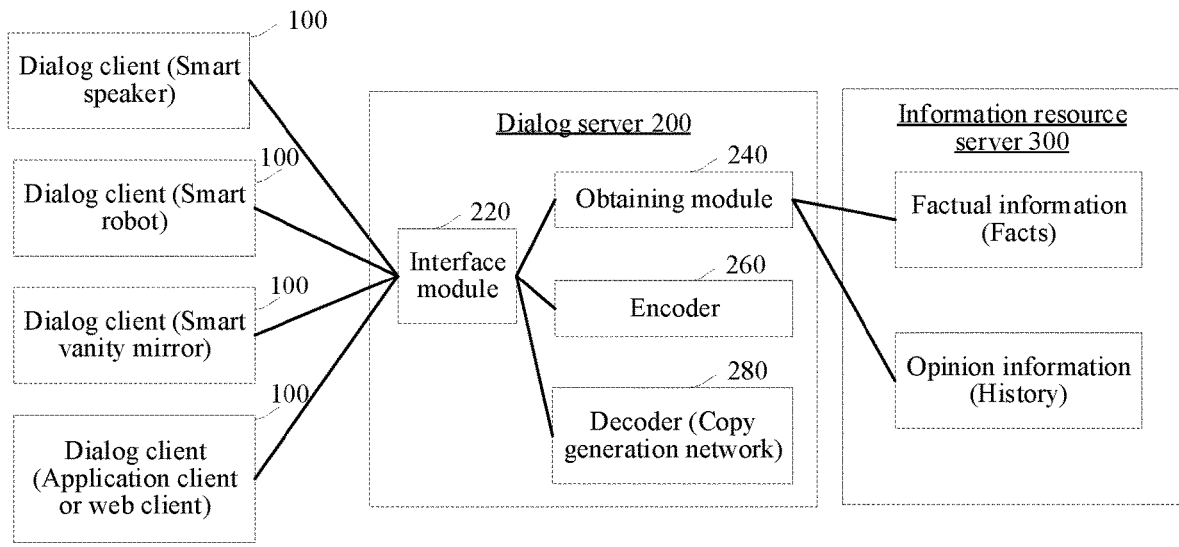
FIG. 1 is a block diagram of a human-machine dialog system according to one embodiment of this application.

For ease of understanding of the technical solutions provided in the embodiments of this application, FIG. 1 is a schematic structural diagram of a human-machine dialog system according to an embodiment of this application. The human-machine dialog system includes: a dialog client 100, a dialog server 200, and an information resource server 300.

The dialog client 100 can be implemented as any device such as a smart speaker, a smart robot, a smart vanity mirror, a smart phone, an application client, or a web client. The dialog client 100 is provided with a microphone and a speaker, or the dialog client 100 is provided with peripheral components for inputting and displaying a text.

The dialog server 200 is a server for providing a backend dialog service for the dialog client 100. The dialog server 200 may be one server or a plurality of servers. A neural network model based on sequence to sequence (seq2seq) is provided in the dialog server 200. The neural network model is used to generate an output dialog sequence based on the input dialog sequence. The dialog server 200 may include, but is not limited to, weather query, business consulting, smart customer service (for air ticket service or restaurant service, etc.).

The dialog server 200 is also connected to the information resource server 300. The information resource server 300 stores factual information (Facts) and opinion information (History). The dialog server 200 can obtain, from the information resource server 300, factual information and/or opinion information related to the input dialog sequence.

In a one embodiment, the dialog server 200 includes: an interface module 220, an obtaining module 240, an encoder 260, and a decoder 280. The interface module 220 is an interaction module or a communication module between the dialog server 200 and the dialog client 100. The interface module 220 is configured to obtain the input dialog sequence of the user from the dialog client 100 and transmit the sequence to the obtaining module 240 and the encoder 260. The interface module 220 is further configured to transmit the output dialog sequence generated by the dialog server 200 to the dialog client 100. The obtaining module 240 is configured to obtain factual information and/or opinion information corresponding to the output dialog sequence in the information resource server 300.

Figure 2:
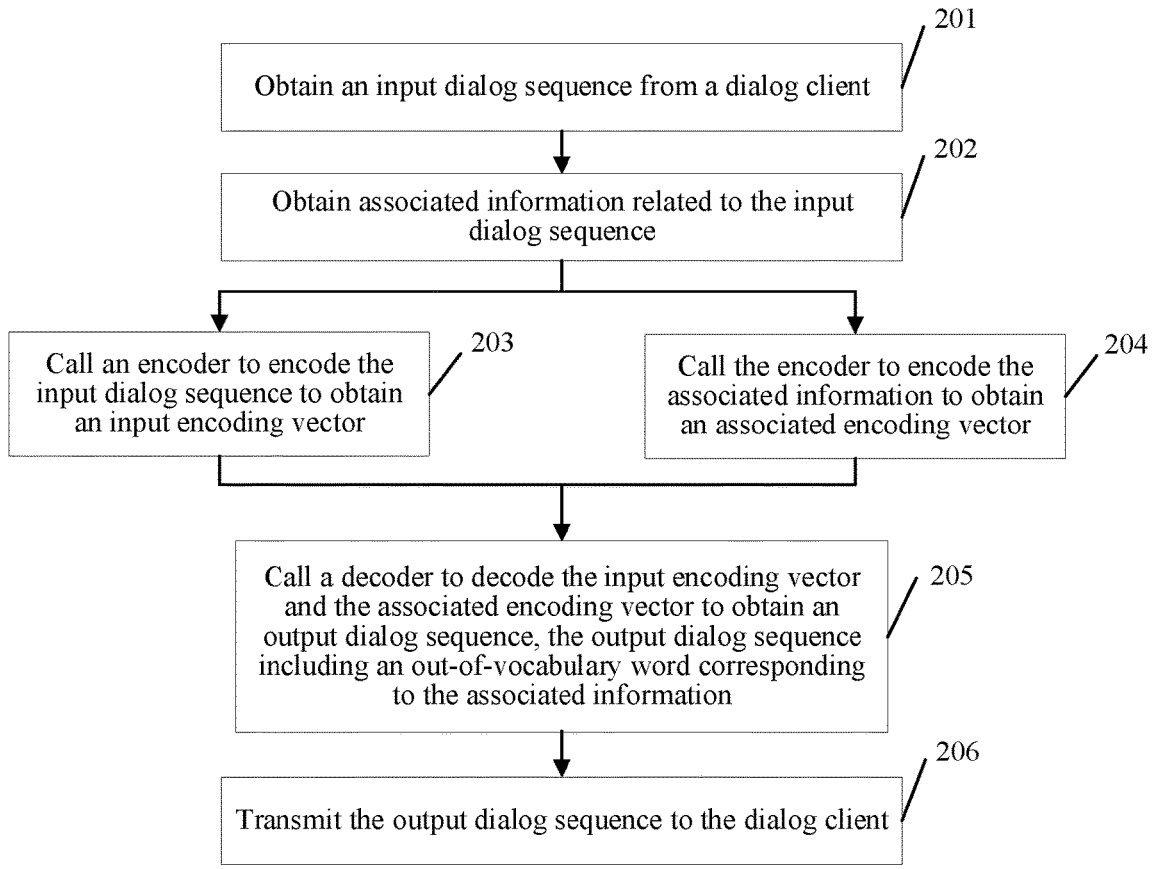
FIG. 2 is a flowchart of a dialog generation method according to one embodiment of this application.

FIG. 2 is a flowchart of a dialog generation method according to one embodiment of this application. In this embodiment, the method being applied to the dialog server 200 in FIG. 1 is taken as an example. The method includes the following steps.

Step 201: Obtain an input dialog sequence from a dialog client.

The input dialog sequence is an input sequence, that is, a to-be-processed dialog sequence.

The dialog client collects the input dialog sequence in text form and/or speech form from a user, and transmits the input dialog sequence to the dialog server. The dialog server obtains the input dialog sequence from the dialog client.

The input dialog sequence in speech form may be converted into the input dialog sequence in text form by the dialog client or the dialog server.

Step 202: Obtain associated information related to the input dialog sequence.

In one embodiment, the dialog server may retrieve the associated information related to the input dialog sequence in an information resource server according to the output dialog sequence.

The associated information includes: factual information (Facts) and/or opinion information (History).

The factual information includes at least one of news reports, encyclopedia knowledge, or common knowledge. The opinion information includes at least one of forum discussion history or a thread.

Step 203: Call an encoder to encode the input dialog sequence to obtain an input encoding vector.

In one embodiment, the dialog server may convert the input dialog sequence into an input word vector, and then call the encoder to encode the input word vector to obtain an input encoding vector. The input encoding vector is a feature vector used to represent an input dialog sequence.

Step 204: Call the encoder to encode the associated information to obtain an associated encoding vector.

In an embodiment, the dialog server may convert the associated information into an associated word vector, and then call the encoder to encode the associated word vector to obtain the associated encoding vector. The associated encoding vector is a feature vector used to represent associated information.

Step 205: Call a decoder to decode the input encoding vector and the associated encoding vector to obtain an output dialog sequence, the output dialog sequence including an out-of-vocabulary word belonging to the associated information.

The out-of-vocabulary (OOV) word refers to words that are not in the dictionary. A dictionary is equivalent to a set of words. If a word is in the dictionary, it is called an in-vocabulary word. Otherwise, it is called an out-of-vocabulary word.

In one embodiment, a decoder is called to dynamically decode the input encoding vector and the associated encoding vector to obtain an output dialog sequence, the output dialog sequence including an out-of-vocabulary word belonging to the associated information. The dynamic decoding includes: generating an output word from a preset dictionary according to the input encoding vector, and/or copying an output word from an extended dictionary according to the associated encoding vector.

In one embodiment, the extended dictionary is a dictionary constructed based on words in the associated information.

Step 206: Transmit the output dialog sequence to the dialog client.

The dialog server transmits the output dialog sequence in text form to the dialog client, or transmits the output dialog sequence in speech form to the dialog client after converting the output dialog sequence in text form into the output dialog sequence in speech form.

In summary, according to the method provided in the embodiments, an encoder is called to encode the input dialog sequence to obtain an input encoding vector; the encoder is called to encode the associated information to obtain an associated encoding vector; and a decoder is called to decode the input encoding vector and the associated encoding vector to obtain an output dialog sequence. Because the output dialog sequence is dynamically generated based on the preset dictionary and the extended dictionary, the output dialog sequence includes an out-of-vocabulary word belonging to the associated information. When the associated information includes factual information and/or opinion information related to the input dialog sequence, the dialog system can automatically generate an answer with factual information and/or opinion information, thereby achieving a good dialog effect.

Figure 3:
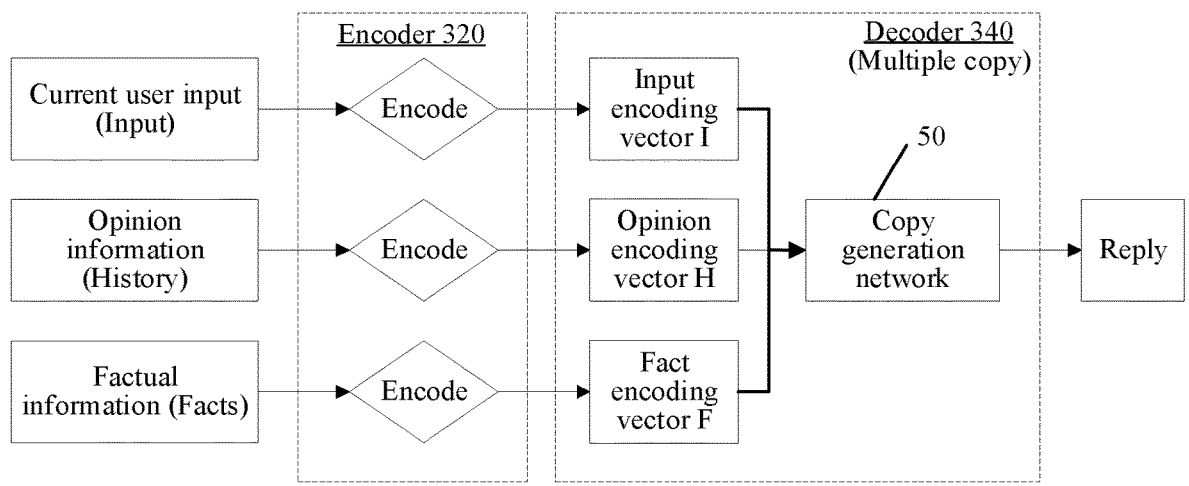
FIG. 3 is a diagram of a principle of a dialog generation method according to one embodiment of this application.

FIG. 3 is a schematic diagram of a principle of a dialog system according to one embodiment of this application. For example, the associated information includes: opinion information (History) and factual information (Facts), and the dialog generation model includes an encoder 320 and a decoder 340. The dialog system obtains a current user input (Input), opinion information (History) related to the current user input, and factual information (Facts) related to the current user input.

The encoder 320 is configured to encode the current user input (Input) to obtain an input encoding vector I; encode the opinion information (History) to obtain an opinion encoding vector H; and encode the factual information (Facts) to obtain a fact encoding vector F. The input encoding vector I, the opinion encoding vector H, and the fact encoding vector F are all encoding vectors.

The encoder 320 is configured to input the input encoding vector I, the opinion encoding vector H, and the fact encoding vector F to the decoder 340.

The decoder 340 is provided with a copy generation network 50. After the input encoding vector I, the opinion encoding vector H, and the fact encoding vector F are inputted into the copy generation network 50, the copy generation network 50 decodes the input encoding vector I, the opinion encoding vector H, and the fact encoding vector F, to obtain the output dialog sequence. The output dialog sequence is a reply to the current user input (Input).

One of or both of the factual information and opinion information can be entered. The fact encoding vector F and/or the opinion encoding vector H obtained by encoding the factual information can be collectively referred to as the associated encoding vector. In the decoding stage, the dialog system inputs the input encoding vector, the associated encoding vector, and decoding information of a previous instant to the copy generation network 50 for decoding, to obtain the output dialog sequence.

Figure 4:
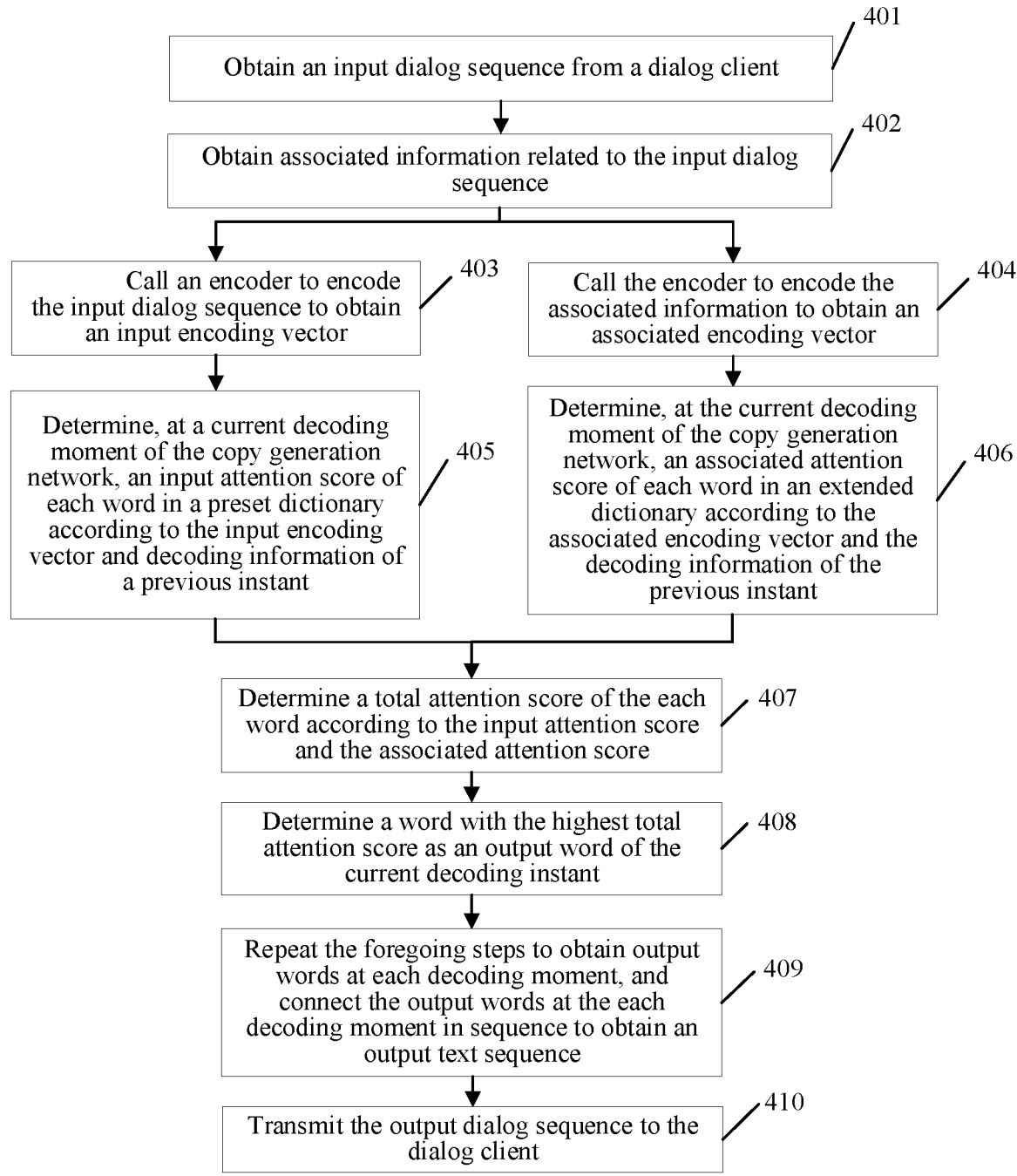
FIG. 4 is a flowchart of a dialog generation method according to one embodiment of this application.

FIG. 4 is a flowchart of a dialog generation method according to one embodiment of this application. In this embodiment, the method being applied to the dialog server 200 in the human-machine dialog system in FIG. 1 is taken as an example. The method includes the following steps.

Step 401: Obtain an input dialog sequence from a dialog client.

The input dialog sequence is an input sequence, that is, a to-be-processed dialog sequence.

The dialog client collects the input dialog sequence in text form and/or speech form from a user, and transmits the input dialog sequence to the dialog server. The dialog server obtains the input dialog sequence from the dialog client.

The input dialog sequence in speech form may be converted into the input dialog sequence in text form by the dialog client or the dialog server.

In one embodiment, the input dialog sequence is a text sequence of a variable length.

Step 402: Obtain associated information related to the input dialog sequence.

In one embodiment, the dialog server retrieves the associated information related to the input dialog sequence in an information resource server according to the output dialog sequence.

The associated information includes: factual information (Facts) and/or opinion information (History).

The factual information includes at least one of news reports, encyclopedia knowledge, or common knowledge. The opinion information includes at least one of forum discussion history or a thread.

Step 403: Call an encoder to encode the input dialog sequence to obtain an input encoding vector.

A correspondence between words and word vectors is preset in the human-machine dialog system. A word vector is a vector that represents a word by using a mathematical method.

The human-machine dialog system performs word segmentation on the input dialog sequence and obtains a plurality of words arranged in order. A word vector corresponding to each word is queried, and the word vector corresponding to each word is arranged to obtain a word vector of the input dialog sequence.

The encoder encodes the word vector of the input dialog sequence to obtain the input encoding vector I. In an embodiment, the encoder is constructed based on Bi-LSTM, but this embodiment does not limit the encoder to a specific type.

Step 404: Call the encoder to encode the associated information to obtain an associated encoding vector.

The human-machine dialog system performs word segmentation on the associated information and obtains a plurality of words arranged in order. A word vector corresponding to each word is queried, and the word vector corresponding to each word is arranged to obtain a word vector of the input dialog sequence.

When the associated information includes opinion information, the human-machine dialog system performs word segmentation on the opinion information and obtains a plurality of words arranged in order. A word vector corresponding to each word is queried, and the word vector corresponding to each word is arranged to obtain a word vector of the opinion information. The encoder encodes the word vector of the opinion information to obtain the opinion encoding vector H.

For example, a single-layer Bi-LSTM is used to encode the word vector of the opinion information to obtain the opinion encoding vector (also known as a hidden state sequence) $H^H = \{h_1^H, \ldots, h_2^H, \ldots, h_i^H, \ldots, h_L^H\}$. H represents opinion information, h represents a hidden state, L represents a total of L hidden states, and i is an integer not greater than L.

When the associated information includes factual information, the human-machine dialog system performs word segmentation on the factual information and obtains a plurality of words arranged in order. A word vector corresponding to each word is queried, and the word vector corresponding to each word is arranged to obtain a word vector of the factual information. The encoder encodes the word vector of the factual information to obtain the fact encoding vector H.

For example, a single-layer Bi-LSTM is used to encode the word vector of the factual information to obtain the fact encoding vector (also known as a hidden state sequence) $H^F = \{h_1^F, h_2^F, \ldots, h_i^F, \ldots, h_L^F\}$. F represents factual information, h represents a hidden state, L represents a total of L hidden states, and i is an integer not greater than L.

In an embodiment, the encoder connects the input encoding vector end to end as an initial state input of the decoder.

In one embodiment, the encoder connects an initial hidden state of the opinion encoding vector and a final hidden state of the fact encoding vector end to end as an initial state input of the decoder. Alternatively, the encoder connects an initial hidden state of the fact encoding vector and a final hidden state of the opinion encoding vector end to end as an initial state input of the decoder. Alternatively, the opinion encoding vector and the fact encoding vector are separately used as an initial state input of the decoder.

Step 405: Determine, at a current decoding instant of the copy generation network, an input attention score of each word in a preset dictionary according to the input encoding vector.

Step 406: Determine, at the current decoding instant of the copy generation network, an associated attention score of each word in an extended dictionary according to the associated encoding vector.

The copy generation network correspondingly includes: the preset dictionary and the extended dictionary. The preset dictionary is a dictionary with a fixed quantity of words and content; and the extended dictionary is a dictionary constructed based on words in factual information and/or opinion information. In an embodiment, the extended dictionary includes a first extended dictionary and/or a second extended dictionary. The first extended dictionary is constructed based on words in the factual information, and the second extended dictionary is constructed based on words in the opinion information.

Consistently, the copy generation network has three modes: a generation mode, an H copy mode and an F copy mode.

Generation mode: Obtain a probability distribution of each word on all vocabularies.

F copy mode: Obtain a probability distribution of each word on a first extended vocabulary corresponding to the factual information.

H copy mode: Obtain a probability distribution of each word on a second extended vocabulary corresponding to the opinion information.

At each decoding instant t, the copy generation network dynamically adopts one of the foregoing modes, and performs decoding to obtain an output word at the current decoding instant. This process is performed based on an attention score of each word, and an attention score is also a probability distribution determined based on the attention score.

In one embodiment, at a current decoding instant t of the copy generation network, the decoder determines an input attention score of each word in a preset dictionary according to the input encoding vector; and determines an associated attention score of each word in an extended dictionary according to the associated encoding vector.

When the associated encoding vector includes the fact encoding vector, the fact attention score of each word in the first extended dictionary is determined according to the fact encoding vector.

For example, the following formula is used to calculate the probability distribution $h_t^{F*}$ of the fact attention score of each word:

$$e_{tj}^F = v_H^F \cdot \tanh(W_h^F \cdot h_j^F + W_r^F \cdot h_t^R + b^F)$$

$$\alpha_{tj}^F = \text{Softmax}(e_{tj}^F)$$

$$h_t^{F*} = \sum_{j=1}^{T} \alpha_{tj}^F h_j^F$$

t refers to the $t^{th}$ decoding instant, $v_H^F$, $W_h^F$, $W_r^F$ and $b^F$ are learnable network parameters, and $h_j^F$ is the $j^{th}$ hidden state in the fact encoding vector, j being an integer not greater than L. F is factual information, and $\alpha_{tj}^F$ is the attention score of the $j^{th}$ word in the fact encoding vector at the decoding instant t.

When the associated encoding vector includes the opinion encoding vector, the opinion attention score of each word in the second extended dictionary is determined according to the opinion encoding vector.

For example, the following formula is used to calculate the probability distribution $h_t^{H*}$ of the opinion attention score of each word:

$$e_{ti}^H = v_H^T \cdot \tanh(W_h^H \cdot h_i^H + W_r^H \cdot h_t^R + b^H)$$

$$\alpha_{ti}^H = \text{Softmax}(e_{ti}^H)$$

$$h_t^{H*} = \sum_{i=1}^{L} \alpha_{ti}^H h_i^H$$

t is the $t^{th}$ decoding instant, $v_H^F$, $W_h^F$, $W_r^F$ and $b^F$ are learnable network parameters, and $h_i^H$ is the $i^{th}$ hidden state in the opinion encoding vector, i being an integer not greater than L. H is opinion information, and $\alpha_{tj}^H$ is the attention score of the $i^{th}$ word in the opinion encoding vector at the decoding instant t.

Step 407: Determine a weight according to the decoding information of the previous instant, and perform a weighted summation on the input attention score and the associated attention score according to the weight, to obtain a total attention score of each word.

For each word, the human-machine dialog system determines a weight according to the decoding information of the previous instant, and performs a weighted summation on the input attention score and the associated attention score according to the weight, to obtain a total attention score of each word.

For example, the human-machine dialog system determines, according to the decoding information of the previous instant, a first weight corresponding to the input attention score, a second weight corresponding to the associated attention score, and a third weight corresponding to the opinion attention score; and adds a product of the input attention score and the first weight, a product of the associated attention score and the second weight, and a product of the opinion attention score and the third weight, to obtain the total attention score of the each word.

For example, the following formula is used to calculate the total attention score of each word:

$$Pr(w|t, H, F) = \sum_{m=1}^{3} Pr(m|t, H, F) \cdot Pr_m(w|t, H, F)$$

H is an opinion encoding vector, F is a fact encoding vector, t is a decoding instant, and m is an index of an attention score corresponding to the three modes (the generation mode, H copy mode, and F copy mode). Pr (m|t, H, F) is an attention score corresponding to the index m at the decoding time t; and $Pr_m$ (m|t, H, F) is a corresponding weight corresponding to the index m at the decoding instant t. The weight is calculated from the decoding information of the previous instant. In an embodiment, the weight is related to the quantity of occurrences of the corresponding word in the opinion information or factual information, the quantity of occurrences being determined based on the decoding information of the previous instant.

Step 408: Determine a word with the highest total attention score as an output word of the current decoding instant.

In one embodiment, the word with the highest total attention score is extracted from the preset dictionary as the output word of the current decoding instant when the word with the highest total attention score belongs to the preset dictionary; and the word with the highest total attention score is copied from the extended dictionary as the output word of the current decoding instant when the word with the highest total attention score belongs to the extended dictionary.

For example, when the word with the highest total attention score belongs to the first extended dictionary, the word is copied from the first extended dictionary as the output word of the current decoding instant; and when the word with the highest total attention score belongs to the second extended dictionary, the word is copied from the second extended dictionary as the output word of the current decoding instant.

Step 409: Repeat the foregoing steps to obtain output words at each decoding instant, and connect the output words at the each decoding instant in sequence to obtain an output text sequence.

Step 410: Transmit the output dialog sequence to the dialog client.

The dialog server transmits the output dialog sequence in text form to the dialog client, or transmits the output dialog sequence in speech form to the dialog client after converting the output dialog sequence in text form into the output dialog sequence in speech form.

In summary, according to the method provided in this embodiment, an encoder is called to encode the input dialog sequence to obtain an input encoding vector; the encoder is called to encode the associated information to obtain an associated encoding vector; and a decoder is called to decode the input encoding vector and the associated encoding vector to obtain an output dialog sequence. Because the output dialog sequence is dynamically generated based on the preset dictionary and the extended dictionary, the output dialog sequence includes an out-of-vocabulary word belonging to the associated information. When the associated information includes factual information and/or opinion information related to the input dialog sequence, the dialog system can automatically generate an answer with factual information and/or opinion information, thereby achieving a good dialog effect.

According to the method provided in this embodiment, an attention mechanism is used to determine an attention score of each word in an extended dictionary, and a dynamic weighting method is used to comprehensively calculate a total attention score of each word. When a total attention score of a word belonging to the extended dictionary is high, the word can be copied to the output dialog sequence.

Figure 5:
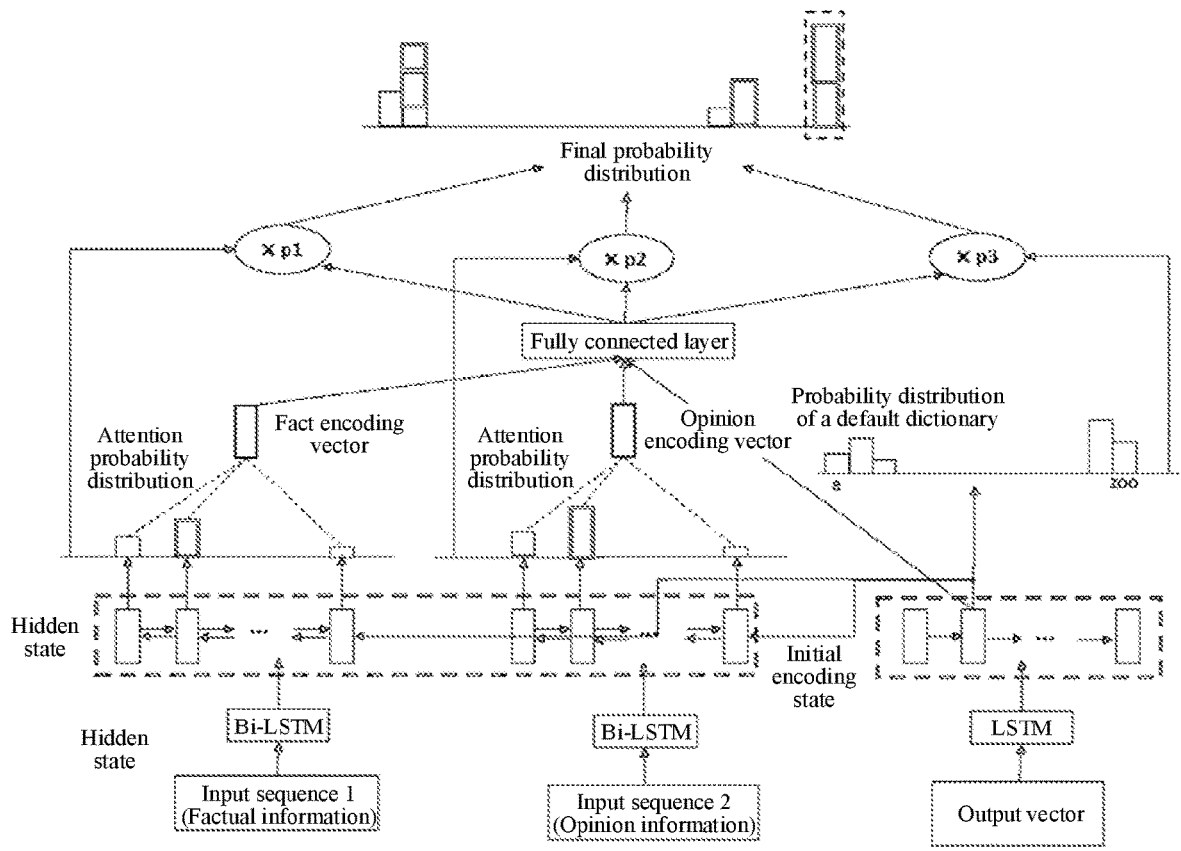
FIG. 5 is a diagram of a principle of a dialog generation method according to one embodiment of this application.

In an illustrative example, referring to FIG. 5, when the user sends an input dialog sequence to the human-machine dialog system and the input dialog sequence is regarded as a sample, all out-of-vocabulary words in associated information (factual information and/or opinion information) corresponding to the input dialog sequence are added to an extended dictionary of this sample. The dashed box on the left in FIG. 5 is the encoder part, and the dashed box on the right is the decoder part. In addition to the input dialog sequence inputted by the user (not shown), there are two additional input sequences. Assume that an input sequence 1 is factual information and an input sequence 2 is opinion information. The input sequence 1 is encoded into a fact encoding vector by using a single-layer Bi-LSTM, and the input sequence 2 is encoded into an opinion encoding vector by using a single-layer Bi-LSTM.

At each decoding instant, an attention probability distribution p1 of each word in the factual information, that is, the attention score of each word in the first extended dictionary, is calculated according to the fact encoding vector; and an attention probability distribution p2 of each word in the opinion information, that is, the attention score of each word in the second extended dictionary, is calculated according to the opinion encoding vector. The first extended dictionary and the second extended dictionary include out-of-vocabulary words. In addition, a probability distribution p3 in a default dictionary may further be determined based on the input dialog sequence of the user. After respective weights corresponding to the three probability distributions p1, p2, and p3 are determined based on the decoding information of the previous decoding instant, a weighted summation is performed on the three probability distributions to obtain a final probability distribution. Therefore, at each decoding instant t, the word with the highest total attention score is outputted as the output word of the current decoding instant. The output words at each decoding instant are sequentially connected to obtain the output text sequence. If the output word at the current decoding instant is an out-of-vocabulary word belonging to H or F, the out-of-vocabulary word is copied to the output dialog sequence, to generate a reply sentence with facts and/or an opinion.

The "human-machine dialog system" in the embodiments of this application won the first place in 7th Dialog System Technology Challenge (DSTC7). Specific data is shown in Table 1 and Table 2. Table 1 is a result of automation evaluation. Table 2 is a result of manual evaluation.

TABLE 1

| Name | NIST-4 | BLEU-4 | Meteor | Entropy-4 | Div-1 | Div-2 | Average length |
|---|---|---|---|---|---|---|---|
| Baseline (constant) | 0.184 | 2.87% | 7.48% | 1.609 | 0.000 | 0.000 | 8 |
| Baseline (random) | 1.637 | 0.86% | 5.91% | 10.467 | 0.160 | 0.647 | 19.192 |
| Baseline (seq2seq) | 0.916 | 1.82% | 6.96% | 5.962 | 0.014 | 0.048 | 10.604 |
| Team C/E | 1.515 | 1.32% | 6.43% | 7.639 | 0.053 | 0.171 | 12.674 |
| Team G | 2.040 | 1.05% | 7.48% | 10.057 | 0.108 | 0.449 | 22.336 |
| Our system-K-means | 2.523 | 1.83% | 8.07% | 9.030 | 0.109 | 0.325 | 15.133 |
| Our system-not using K-means | 1.771 | 1.94% | 7.64% | 8.194 | 0.094 | 0.267 | 12.770 |
| Human | 2.650 | 3.13% | 8.31% | 10.445 | 0.167 | 0.670 | 18.757 |

In Table 1, there are a total of 2208 test samples. The organizer of DSTC7 provided three baselines (control groups): (1) Constant: Invariably answer: "I don't know what you mean."; (2) Random: Randomly select an answer from training data; and (3) Sequence to sequence (seq2seq): Use Vanilla Keras seq2seq model for training. Team C/E and Team G are systems used by the other two teams in this competition. For formal evaluation, we submitted two systems. One system uses the K-means beam search as the main system, and the other system is an auxiliary system that does not use the K-means beam search. In addition, response of a human is added for comparison. All response outputs are scored based on the following indicators: NIST (the machine translation evaluation indicator proposed by Dod-dington in 2002), BLEU (Papineni et al., 2002), Me-teor (Denkowski & Lavie, 2014), DIV-1, DIV-2 (also known as distinct-1 and distinct-2) (Li et al., 2016), and Entropy 1-4 (Zhang et al., 2018).

As shown in Table 1, the system has achieved the best result on main indicators of NIST-4, BLEU-4, and Meteor. In addition, the use of K-means beam search can effectively improve the performance of almost all major algorithms and all diversity indicators. In terms of the average response length, our system produces a longer response than the seq2seq baseline. In addition, compared with the system not using K-means beam search, the system using K-means beam search has a longer response time. On average, human response time is longer than the response time of our system, and the response time of Team G which is generated by using 22 tokens on average is even longer. In terms of the ability to output out-of-vocabulary (OOV) words not covered by the first 100 k vocabulary, our system generates 97 and 57 unique OOV words in the submitted test responses by using K-means beam search and traditional beam search respectively. Compared with traditional beam search, K-means beam search can replicate more OOV words.

TABLE 2

| Name Model | Relevance and appropriateness | | Interest and information | | Total | |
|---|---|---|---|---|---|---|
| | Average score | 95% Confidence | Average score | 95% Confidence | Average score | 95% Confidence |
| Baseline (constant) | 2.60 | (2.560, 2.644) | 2.32 | (2.281, 2.364) | 2.46 | (2.424, 2.500) |
| Baseline (random) | 2.32 | (2.269, 2.371) | 2.35 | (2.303, 2.401) | 2.34 | (2.288, 2.384) |
| Baseline (seq2seq) | 2.91 | (2.858, 2.963) | 2.68 | (2.632, 2.730) | 2.80 | (2.748, 2.844) |
| Team C/E ($2^{nd}$ place) | 3.05 | (3.009, 3.093) | 2.77 | (2.735, 2.812) | 2.91 | (2.875, 2.950) |
| Team G ($3^{rd}$ place) | 2.82 | (2.771, 2.870) | 2.57 | (2.525, 2.619) | 2.70 | (2.650, 2.742) |
| Our system ($1^{st}$ place) | 2.99 | (2.938, 3.042) | 2.87 | (2.822, 2.922) | 2.93 | (2.882, 2.979) |
| Human | 3.61 | (3.554, 3.658) | 3.49 | (3.434, 3.539) | 3.55 | (3.497, 3.596) |

In Table 2, 1 k test samples were carefully selected by the DSTC7 organizer for competition testing, and then the results were evaluated manually. As shown in Table 2, manual evaluation focuses on two categories, "relevance and appropriateness" and "interest and information". Compared with the baseline of seq2seq, our system significantly exceeds the baseline at the 95% confidence level. In addition, compared with the team that ranks second, our system achieved the best result with 95% confidence in the "interest and information" category. Overall, our system ranks first in the competition.

The following describes an apparatus embodiment in this application. For details not specifically described in the apparatus embodiment, refer to a corresponding description in the foregoing corresponding method embodiment.

Figure 6:
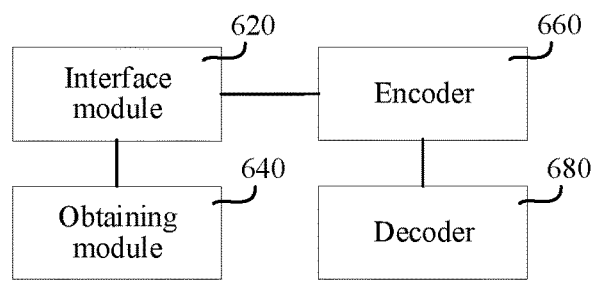
FIG. 6 is a block diagram of a dialog generation apparatus according to one embodiment of this application.

FIG. 6 is a block diagram of a dialog generation apparatus according to one embodiment of this application. The dialog generation apparatus can be implemented as all or a part of the human-machine dialog system through software, hardware or a combination of the two. The apparatus includes: an interface module 620, an obtaining module 640, an encoding module 660, and a decoding module 680.

The interface module 620 is configured to obtain an input dialog sequence from a dialog client.

The obtaining module 640 is configured to obtain associated information related to the input dialog sequence.

The encoding module 660 is configured to encode the input dialog sequence to obtain an input encoding vector.

The encoding module 660 is further configured to encode the associated information to obtain an associated encoding vector.

The decoding module 680 is configured to decode the input encoding vector and the associated encoding vector to obtain an output dialog sequence, the output dialog sequence including an out-of-vocabulary word belonging to the associated information.

The interface module 620 is configured to transmit the output dialog sequence to the dialog client.

In one embodiment, the decoding module 680 includes a copy generation network.

The decoding module 680 is configured to input the input encoding vector, the associated encoding vector, and decoding information of a previous instant to the copy generation network for decoding, to obtain the output dialog sequence.

In one embodiment, the decoding module 680 is configured to determine, at a current decoding instant of the copy generation network, an input attention score of each word in a preset dictionary according to the input encoding vector; determine, at the current decoding instant of the copy generation network, an associated attention score of each word in an extended dictionary according to the associated encoding vector; determine a weight according to the decoding information of the previous instant, and perform a weighted summation on the input attention score and the associated attention score according to the weight, to obtain a total attention score of the each word; and determine a word with the highest total attention score as an output word of the current decoding instant.

The extended dictionary is a dictionary constructed based on words in the associated information.

In one embodiment, the associated information includes factual information and/or opinion information, and the associated encoding vector includes: a fact encoding vector and an opinion encoding vector.

The decoding module 680 is further configured to determine a fact attention score of each word in a first extended dictionary according to the fact encoding vector.

The decoding module 680 is further configured to determine an opinion attention score of each word in a second extended dictionary according to the opinion encoding vector.

The first extended dictionary is a dictionary constructed based on words in the factual information and the second extended dictionary is a dictionary constructed based on words in the opinion information.

In one embodiment, the decoding module 680 is configured to determine, according to the decoding information of the previous instant, a first weight corresponding to the input attention score, a second weight corresponding to the associated attention score, and a third weight corresponding to the opinion attention score; and add a product of the input attention score and the first weight, a product of the associated attention score and the second weight, and a product of the opinion attention score and the third weight, to obtain the total attention score of the each word.

In one embodiment, the decoding module 680 is configured to extract the word with the highest total attention score from the preset dictionary as the output word of the current decoding instant when the word with the highest total attention score belongs to the preset dictionary; and copy the word with the highest total attention score from the extended dictionary as the output word of the current decoding instant when the word with the highest total attention score belongs to the extended dictionary.

Figure 7:
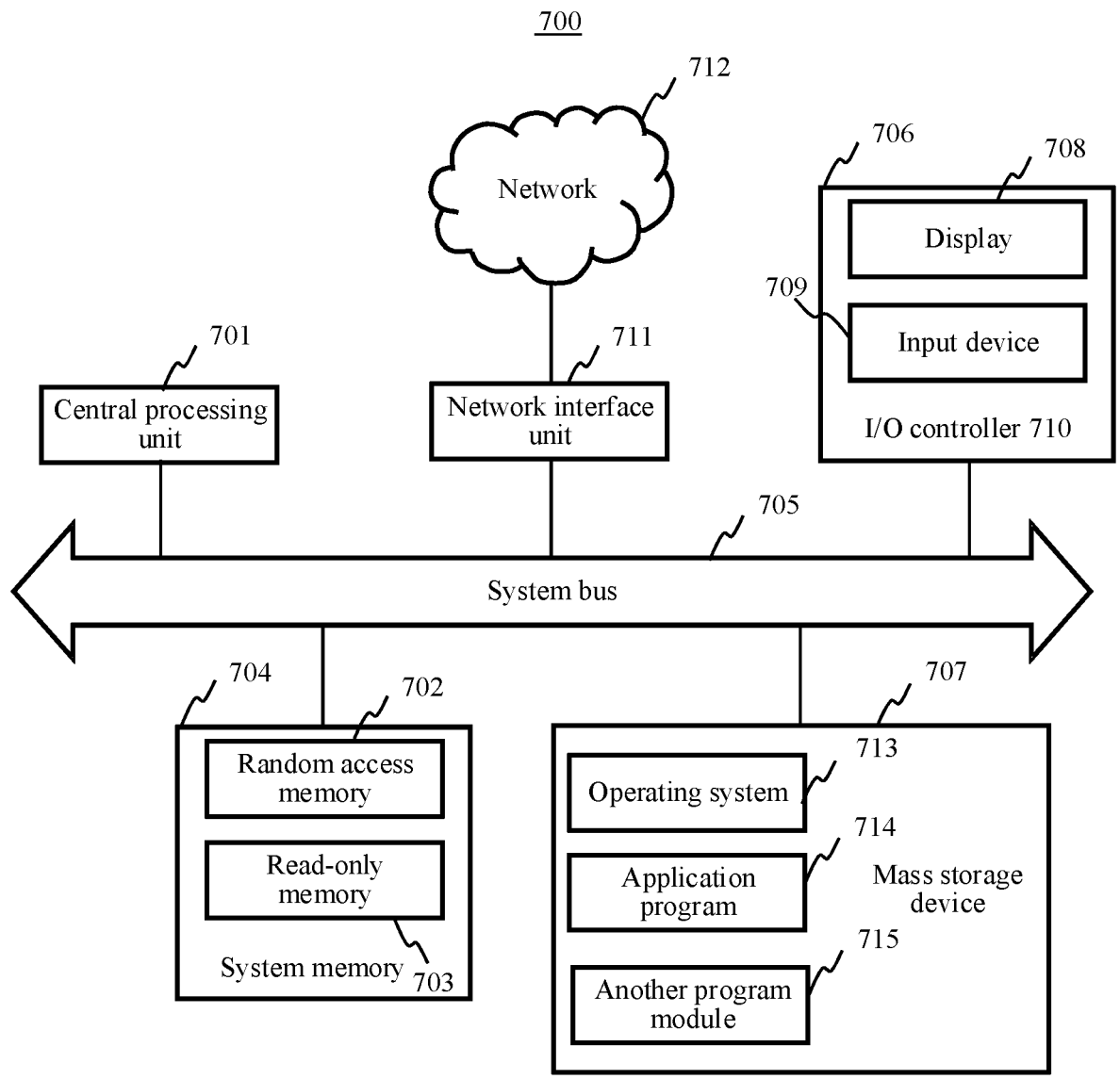
FIG. 7 is a block diagram of a computer device according to one embodiment of this application.

FIG. 7 is a schematic structural diagram of a computer device according to an embodiment of this application. The computer device may be a dialog server, and the dialog server is configured to execute the dialog generation method provided in the foregoing embodiments.

Specifically, the computer device 700 includes a central processing unit (CPU) 701, a system memory 704 including a random access memory (RAM) 702 and a read-only memory (ROM) 703, and a system bus 705 connecting the system memory 704 and the CPU 701. The computer device 700 further includes a basic input/output (I/O) system 706 assisting in transmitting information between components in the computer, and a mass storage device 707 configured to store an operating system 713, an application program 714, and another program module 715.

The basic I/O system 706 includes a display 708 configured to display information, and an input device 709 configured to allow a user to enter information, for example, a mouse or a keyboard. The display 708 and the input device 709 are both connected to the central processing unit 701 by using the system bus 705 connected to an input/output controller 710. The basic I/O system 706 may further include the I/O controller 710, to receive and process input from multiple other devices such as a keyboard, a mouse, and an electronic stylus. Similarly, the I/O controller 710 further provides an output to a display, a printer or another type of output device.

The mass storage device 707 is connected to the CPU 701 by using a mass storage controller (not shown) connected to the system bus 705. The mass storage device 707 and a computer-readable medium associated with the large-capacity storage device provide non-volatile storage to the computer device 700. That is, the mass storage device 707 may include the computer readable medium (not shown) such as a hard disk or a CD-ROM drive.

In general, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, a person skilled in art can know that the computer storage medium is not limited to the foregoing several types. The system memory 704 and the mass storage device 707 may be collectively referred to as a memory.

According to the embodiments of this application, the computer device 700 may further be connected, through a network such as the Internet, to a remote computer on the network and run. That is, the computer device 700 may be connected to a network 712 by using a network interface unit 711 connected to the system bus 705, or may be connected to another type of network or a remote computer system (not shown) by using a network interface unit 711.

The memory further includes one or more computer-readable instructions. The one or more computer-readable instructions are stored in the memory and configured to be executed by one or more processors. The one or more computer-readable instructions are configured to implement the dialog generation method.

This application further provides a computer-readable storage medium, the storage medium storing at least one computer-readable instruction, at least one program, a code set, or a computer-readable instruction set, the at least one computer-readable instruction, the at least one program, the code set, or the computer-readable instruction set being loaded and executed by a processor to implement the dialog generation method according to the foregoing method embodiments.

In one embodiment, this application further provides a computer program product including computer readable instructions. The product, when running on an electronic device, causes the electronic device to execute the dialog generation method according to the foregoing method embodiments.

The term unit, and other similar terms such as subunit, module, submodule, etc., in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this specification, execution of the steps is not strictly limited, and the steps may be performed in other orders. Moreover, at least some of the steps in each embodiment may include a plurality of sub-steps or a plurality of stages. The sub-steps or stages are not necessarily performed at the same instant but may be performed at different instants. Execution of the sub-steps or stages is not necessarily sequentially performed, but may be performed alternately with other steps or at least some of sub-steps or stages of other steps.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A dialog generation method, performed by a human-machine dialog system, the method comprising:
obtaining an input dialog sequence from a dialog client;
obtaining associated information related to the input dialog sequence;
encoding the input dialog sequence into an input encoding vector, and determining an input attention score of each word in a preset dictionary according to the input encoding vector, the preset dictionary being a dictionary with a fixed quantity of words and content;
encoding the associated information into an associated encoding vector, and determining an associated attention score of each word in an extended dictionary according to the associated encoding vector, the extended dictionary being a dictionary constructed based on words in the associated information;
determining weights according to decoding information of a previous instant, and performing a weighted summation on the input attention score and the associated attention score, to obtain a total attention score of each word;
in response to a word with a highest total attention score belonging to the preset dictionary, including the word from the preset dictionary into an output dialog sequence;
in response to a word with the highest total attention score belonging to the extended dictionary, including the word from the extended dictionary into the output dialog sequence; and
transmitting the output dialog sequence to the dialog client.

2. The method according to claim 1, wherein the associated information comprises factual information and opinion information, the associated encoding vector comprises: a fact encoding vector and an opinion encoding vector; and
the determining an associated attention score of each word in an extended dictionary according to the associated encoding vector comprises:
determining a fact attention score of each word in a first extended dictionary according to the fact encoding vector; and
determining an opinion attention score of each word in a second extended dictionary according to the opinion encoding vector;
the first extended dictionary being a dictionary constructed based on words in the factual information and the second extended dictionary being a dictionary constructed based on words in the opinion information.

3. The method according to claim 2, wherein the determining a weight according to the decoding information of the previous instant, and performing a weighted summation on the input attention score and the associated attention score, to obtain a total attention score of each word comprises:
determining, according to the decoding information of the previous instant, a first weight corresponding to the input attention score, a second weight corresponding to the associated attention score, and a third weight corresponding to the opinion attention score; and
adding a product of the input attention score and the first weight, a product of the associated attention score and the second weight, and a product of the opinion attention score and the third weight, to obtain the total attention score of each word.

4. The method according to claim 1, wherein encoding the input dialog sequence into the input encoding vector comprises:
performing word segmentation on the input dialog sequence to obtain words arranged in an order;
querying word vectors corresponding to each of the words;
arranging the word vectors corresponding to each of the words in the order to obtain a word vector of the input dialog sequence; and
encoding the word vector of the input dialog sequence to obtain the input encoding vector.

5. The method according to claim 1, wherein the transmitting the output dialog sequence to the dialog client comprises:
converting the output dialog sequence in text form to the output dialog sequence in speech form; and transmitting the output dialog sequence in speech form to the dialog client.

6. A dialog generation apparatus comprising:
one or more processors and a memory, the memory storing at least one computer-readable instruction, at least one program, a code set, or a computer-readable instruction set, the at least one computer-readable instruction, the at least one program, the code set, or the computer-readable instruction set being loaded and executed by the one or more processors to implement a plurality of operations comprising:
obtaining an input dialog sequence from a dialog client;
obtaining associated information related to the input dialog sequence;
encoding the input dialog sequence into an input encoding vector, and determining an input attention score of each word in a preset dictionary according to the input encoding vector, the preset dictionary being a dictionary with a fixed quantity of words and content;
encoding the associated information into an associated encoding vector, and determining an associated attention score of each word in an extended dictionary according to the associated encoding vector, the extended dictionary being a dictionary constructed based on words in the associated information;
determining weights according to decoding information of a previous instant, and performing a weighted summation on the input attention score and the associated attention score, to obtain a total attention score of each word;
in response to a word with a highest total attention score belonging to the preset dictionary, including the word from the preset dictionary into an output dialog sequence;
in response to a word with the highest total attention score belonging to the extended dictionary, including the word from the extended dictionary into the output dialog sequence; and
transmitting the output dialog sequence to the dialog client.

7. The apparatus according to claim 6, wherein the associated information comprises factual information and opinion information, and the associated encoding vector comprises: a fact encoding vector and an opinion encoding vector; and
the determining an associated attention score of each word in an extended dictionary according to the associated encoding vector comprises:
determining a fact attention score of each word in a first extended dictionary according to the fact encoding vector; and
determining an opinion attention score of each word in a second extended dictionary according to the opinion encoding vector; the first extended dictionary being a dictionary constructed based on words in the factual information and the second extended dictionary being a dictionary constructed based on words in the opinion information.

8. The apparatus according to claim 7, wherein the determining a weight according to the decoding information of the previous instant, and performing a weighted summation on the input attention score and the associated attention score, to obtain a total attention score of each word comprises:
determining, according to the decoding information of the previous instant, a first weight corresponding to the input attention score, a second weight corresponding to the associated attention score, and a third weight corresponding to the opinion attention score; and
adding a product of the input attention score and the first weight, a product of the associated attention score and the second weight, and a product of the opinion attention score and the third weight, to obtain the total attention score of the each word.

9. The apparatus according to claim 6, wherein encoding the input dialog sequence into the input encoding vector comprises:
performing word segmentation on the input dialog sequence to obtain words arranged in an order;
querying word vectors corresponding to each of the words; arrange the word vectors corresponding to each of the words in the order to obtain a word vector of the input dialog sequence; and
encoding the word vector of the input dialog sequence to obtain the input encoding vector.

10. The apparatus according to claim 6, wherein the transmitting the output dialog sequence to the dialog client comprises: converting the output dialog sequence in text form to the output dialog sequence in speech form; and transmitting the output dialog sequence in speech form to the dialog client.

11. A non-transitory computer-readable storage medium, storing computer-readable instructions, when executed by one or more processors, the computer-readable instructions cause one or more processors to implement a dialog generation method comprising:
obtaining an input dialog sequence from a dialog client;
obtaining associated information related to the input dialog sequence;
encoding the input dialog sequence into an input encoding vector, and determining an input attention score of each word in a preset dictionary according to the input encoding vector, the preset dictionary being a dictionary with a fixed quantity of words and content;
encoding the associated information into an associated encoding vector, and determining an associated attention score of each word in an extended dictionary according to the associated encoding vector, the extended dictionary being a dictionary constructed based on words in the associated information;
determining weights according to decoding information of a previous instant, and performing a weighted summation on the input attention score and the associated attention score, to obtain a total attention score of each word;
in response to a word with a highest total attention score belonging to the preset dictionary, including the word from the preset dictionary into an output dialog sequence;
in response to a word with the highest total attention score belonging to the extended dictionary, including the word from the extended dictionary into the output dialog sequence; and
transmitting the output dialog sequence to the dialog client.

12. The computer readable medium according to claim 11, wherein the associated information comprises factual information and opinion information, the associated encoding vector comprises: a fact encoding vector and an opinion encoding vector; and
the determining an associated attention score of each word in an extended dictionary according to the associated encoding vector comprises:

determining a fact attention score of each word in a first extended dictionary according to the fact encoding vector; and determining an opinion attention score of each word in a second extended dictionary according to the opinion encoding vector;

the first extended dictionary being a dictionary constructed based on words in the factual information and the second extended dictionary being a dictionary constructed based on words in the opinion information.

* * * * *